No. 674,146. Patented May 14, 1901.
T. B. WHITE.
ADJUSTABLE MAP.
(Application filed Jan. 31, 1900. Renewed Apr. 12, 1901.)
(No Model.)
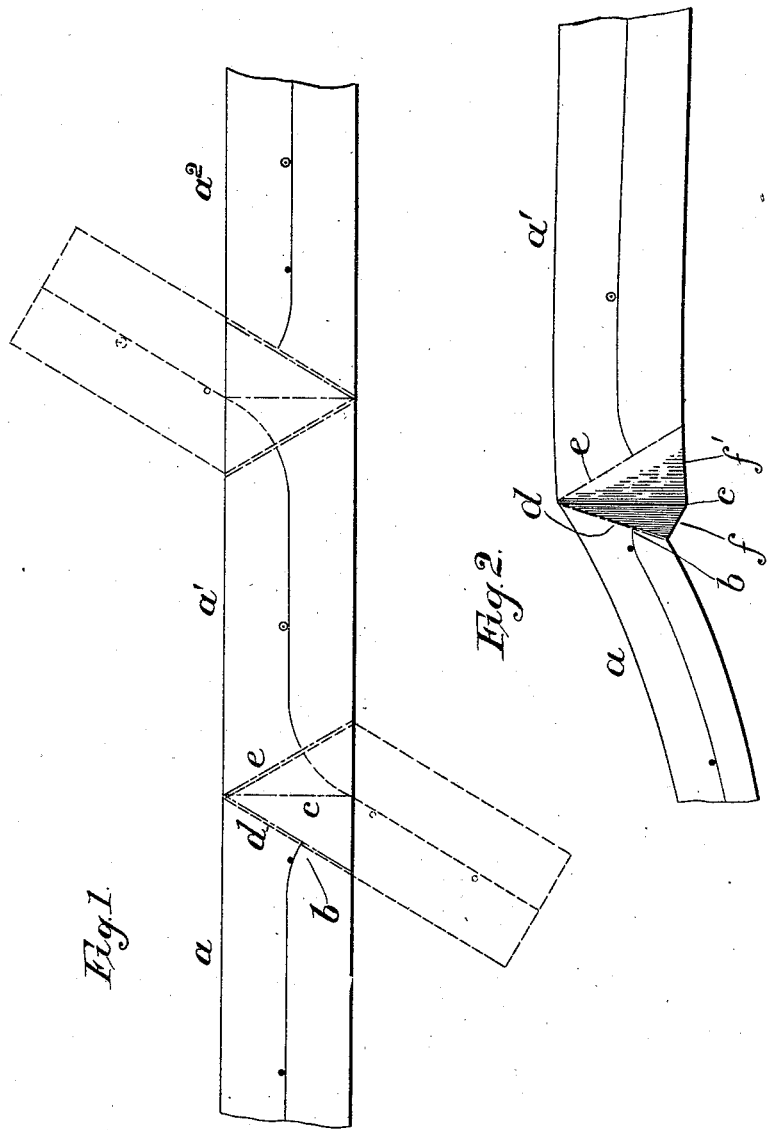
Witnesses:
L. O. Henderson
H. I. Dyzert
Inventor
Thomas Brook White
by T. J. Geisler
Att'y.

UNITED STATES PATENT OFFICE.

THOMAS BROOK WHITE, OF PORTLAND, OREGON.

ADJUSTABLE MAP.

SPECIFICATION forming part of Letters Patent No. 674,146, dated May 14, 1901.

Application filed January 31, 1900. Renewed April 12, 1901. Serial No. 55,592. (No model.)

*To all whom it may concern:*

Be it known that I, THOMAS BROOK WHITE, a citizen of the United States, residing at Portland, in the county of Multnomah and State of Oregon, have invented a certain new and useful Improvement in Adjustable Maps, of which the following is a full, clear, and exact specification.

My invention relates generally to map-making, and embraces maps, plans, and charts of every description in which a long meandering line is to be shown.

The objects I had in view were twofold. In the first place I desired to obtain a map or plan which would show a long meandering line in continuous form, so that its general direction and its deflections therefrom and the relative bearings of the latter would be graphically delineated, the width of the map-surface to be confined to practical proportions—that is to say, to be no greater than sufficient to show the general direction of the meandering line and moderate deflections in such line—and the map being adapted to be so arranged that it will retain the continuity of the line shown notwithstanding sharp deflections therein, and in the second place I desired to obtain some tangible practical method for making a map which would fulfil the requirements above expressed. Another end attained by this method is the great economy in the paper, cloth, or other material used in making the map I am about to describe. For example, should it be desired to show by the method now in general use a detail drawing of a line of railroad on the commonly-adapted scale of two hundred feet to one inch, the general direction of the road being east and west, then a north and south deflection of two and a half miles would necessitate the use of the widest paper made, and should the northing and southing exceed two miles and a half the line would run off the paper, by reason of which such line must be broken and started anew on the sheet.

The use of wide material on which to plot a narrow line is both inconvenient and wasteful. By the method now in common use for showing meandering lines in detail the greater portion of the material on which the map is drawn is wasted and renders the map unnecessarily bulky, and then, besides, the frequent interruption of the line is a source of annoyance and waste in material and labor. An illustration of this is found in the case of a break in a detail map of a railroad where the general direction of the line changes near the point of interruption. In such case in order that the meanderings of the line may be comprehensively followed from the point of deflection and the relative bearings of the latter noted it is frequently required that a part of the line be replotted. These objections are in my invention overcome, as will be apparent from the description hereinafter given.

The practice of my newly-invented art in map-making is shown in the accompanying drawings, constituting a part hereof, in which—

Figure 1 shows a long sheet of paper on which is traced a portion of the center line of a railroad. At those points where the bearings change to such an extent as to run off the paper the line is seen temporarily broken, the angle of deflection is laid off and marked by the dotted guide-lines $d\ e$, and by the dotted outline of the paper the map is shown arranged so as to make the plotted line continuous. In Fig. 2 part of the map is shown in perspective to illustrate the method of constuction for arranging the map so as to show in a continuous line two sections of the course of different bearings.

Referring to the letters in the drawings, $a$ represents a portion of a long sheet of paper of sufficient width on which are plotted the meanderings of a line of survey of a railroad. At $b$ the line, if continued, would have run off the paper to the south. At this point the line is therefore interrupted. A downward crease $c$ (see Fig. 2) is made across the paper at right angles to its length. The angle of deflection of the general bearing of the course from this point is ascertained, and one-half of such angle of deflection is laid off on each side of the crease $c$ and the sides of the resulting triangular area indicated by lines $d\ e$. An upward fold is made in the paper at the line $d$, as shown in Fig. 2, so that the surfaces $f\ f'$ of the paper may be turned under. Thus by so folding such surfaces under the back of the map the map-surface will be arranged as shown in Fig. 1 by the broken outlines, and the plotting of the line is then continued from the point of interruption on section $a'$. At the point where the course of the line again changes—in this instance to the north—to such an extent as to run off the paper the line is again interrupted, and substantially the same procedure is followed as was explained with respect to section $a\ a'$. The plotting is then continued on section $a^2$ in the same manner as before, and a like procedure would be followed throughout the entire map. The dotted lines $d\ e$ serve as fixed guides for arranging the section $a\ a'\ a^2$ so as to correctly show the relative courses of the projected line.

Any material may be used for making the maps in accordance with the art invented by me so long as it possesses sufficient flexibility to submit to the treatment above described.

Having fully described my invention, I claim and desire to secure by Letters Patent—

1. A map comprising a strip having delineated thereon in horizontal projection a meandering line, or course, said strip having an intermediate portion or portions along such meandering line, adapted to be folded, to cause the map-surface to follow the general direction of the meandering line, substantially as described.

2. A map comprising a strip, having delineated thereon in horizontal projection a meandering line, or course, the strip being provided with guide-lines marking a triangular area; a crease bisecting such area and another crease along one of the sides thereof, thereby adapting such area to be folded to cause the map-surface to follow the general direction of the meandering line, substantially as described.

In testimony whereof I have hereunto set my hand in the presence of two witnesses.

THOMAS BROOK WHITE.

Witnesses:
T. J. GEISLER,
L. D. HENDERSON.